(12) United States Patent
Beentjes

(10) Patent No.: US 6,758,933 B2
(45) Date of Patent: Jul. 6, 2004

(54) METHOD AND APPARATUS FOR STRIP-COATING A METALLIC STRIP-SHAPED SUBSTRATE WITH A PLASTIC BAND AND STRIP THUS OBTAINED

(75) Inventor: Petrus Cornelis Jozef Beentjes, Castricum (NL)

(73) Assignee: Corus Staal BV, Ca Ijmuiden (NL)

( * ) Notice: Subject to any disclaimer, the term of this patent is extended or adjusted under 35 U.S.C. 154(b) by 0 days.

(21) Appl. No.: 09/341,637

(22) PCT Filed: Jan. 23, 1998

(86) PCT No.: PCT/NL98/00051

§ 371 (c)(1),
(2), (4) Date: Sep. 3, 1999

(87) PCT Pub. No.: WO98/39160

PCT Pub. Date: Sep. 11, 1998

(65) Prior Publication Data

US 2002/0124944 A1 Sep. 12, 2002

(30) Foreign Application Priority Data

Jan. 23, 1997 (NL) ............................................... 1005066
Feb. 18, 1997 (NL) ............................................... 1005304

(51) Int. Cl.[7] ............................................... B29C 47/88
(52) U.S. Cl. .................. 156/244.27; 156/322; 156/378; 156/501; 427/211; 427/318
(58) Field of Search ............................... 156/500–501, 156/322, 378, 244.27, 244.11, 244.23; 427/211, 178, 318

(56) References Cited

U.S. PATENT DOCUMENTS 3,959,567 A * 5/1976 Bradley ....................... 428/461
4,007,078 A * 2/1977 Aoki et al. ................... 156/244
4,289,559 A * 9/1981 Murphy ....................... 156/238
4,994,130 A * 2/1991 Ichikawa et al. .......... 156/244.27
5,407,702 A * 4/1995 Smith et al. .................. 156/322
5,952,017 A * 9/1999 Nishida et al. .............. 425/363

FOREIGN PATENT DOCUMENTS

| CA | 2136746 | 12/1993 |
|----|---------|---------|
| EP | 0067060 | 12/1982 |
| WO | 9324324 | 12/1993 |
| WO | 9609169 | 3/1996 |
| WO | 9732715 | 9/1997 |

OTHER PUBLICATIONS

Patent Abstracts of Japan, vol. 095, No. 005, Jun. 30, 1995 for JP 07041744A Feb. 1995.
Patent Abstracts of Japan, vol. 017, No. 591 (C1125), Oct. 28, 1993 for JP 05177168A Jul. 1993.
Canadian Published Patent Application No. 2,136,746, Kiriazis et al., published Dec. 9, 1993.

* cited by examiner

Primary Examiner—Jeff H. Aftergut
Assistant Examiner—Jessica Rossi
(74) Attorney, Agent, or Firm—Stevens, Davis, Miller & Mosher, LLP

(57) ABSTRACT

Method for strip-coating a metallic strip-shaped substrate (1) with a band (3) of plastic comprising the stages: (i) in-situ casting of a plastic band; (ii) leading the plastic band around a cooling roll (5, 5a); (iii) leading away the plastic band until the plastic band production is underway and stabilized; (iv) bringing the plastic band up to speed and heating the substrate to a temperature of the substrate close to the softening temperature of the part of the plastic band facing the substrate; (v) pressing the plastic band onto the substrate and where applicable breaking off the plastic band and stopping it being led away; (vi) coating the substrate (1) with the plastic band (3) at high speed.

20 Claims, 3 Drawing Sheets

METHOD AND APPARATUS FOR STRIP-COATING A METALLIC STRIP-SHAPED SUBSTRATE WITH A PLASTIC BAND AND STRIP THUS OBTAINED

The invention relates to a method for strip-coating a metallic strip-shaped substrate with a thin strip of plastic, an apparatus for carrying out the method as well as to the coated strip obtained with the method.

There are at least two methods known for manufacturing a coated product comprising a metal substrate and a plastic layer adhering to it, namely film-laminating and extrusion-coating.

In the case of film-laminating, a finished plastic film is unrolled and applied onto the metal substrate, as disclosed in e.g. WO 93/24324.

In the case of extrusion-coating a sheet of plastic is applied onto the metal substrate directly or virtually directly from an extruder, as disclosed in e.g. EP 0 067 060 Al.

In the case of the first method a roll of finished film is taken as stag material, A problem in making a roll of film is rolling it up. The film tends to stick to itself so that the windings cling to each other. Because in its rolled up state the film shrinks somewhat the roll has to be rolled up loosely to enable it to be unrolled once again in a controlled way. Inevitable stresses in the film then easily cause edge build-up, the roll becomes unround, and the film displays spacing tracks when being unrolled. Among other things this makes the film incapable of being unrolled without difficulty at a sufficiently high speed; if is does succeed then there remains the problem that at higher rolling off speeds electrostatic discharge symptoms need to be reckoned with. To avoid such difficulties additives are added to for example household foils; in the case of film-lamination this solution offers no remedy because the additives unacceptably reduce the capacity to adhere to the metal substrate.

On the face of it extrusion-coating would therefore seem an interesting alternative, and so it is for a small number of applications, namely those whereby the plastic involved has the correct adhesion properties in molten state. When this is no longer the cases or not adequately so, and molecules need to be incorporated in the plastic to migrate to the surface in order to accomplish adhesion, in the case of extrusion-coating the problems occur, at least where a high coating speed is desired. This is because adhesion groups only migrate fast enough, i.e. within tenths of a second, if a sufficiently high temperature can be maintained dig the coating. This is only possible when coating onto one side of the substrate, The required high temperature then also makes it impossible subsequently to coat the other side because the previously applied coating becomes unacceptably damaged on the second exposure to the high temperature. Even non-subsequent but simultaneous two-sided extrusion-coating is no solution because in the case of extrusion-coating the slightest deviation in substrate thickness and the slightest disturbance in the process would cause unstable process operation and consequently coating differences and inhomogeneities on each side.

The problems surrounding the procedures outlined are resolved or at least largely reduced if worked in accordance with the invention.

The method in accordance with the invention is characterized in that it comprises in combination the stages (i) in-situ casting of a plastic strip;

(ii) leading the plastic strip around a preferably initially water-cooled cooling roll;

(iii) leading away the plastic strip until the plastic strip production is underway and stabilised;

(iv) bringing the plastic strip and the substrate up to speed and heating the substrate to a temper of the substrate close to or above the softening temperature of the part of the plastic strip facing the substrate;

(v) pressing the plastic strip onto the substrate and where applicable breaking off the plastic strip and stopping it being led away, while the substrate and the cooling roll are connected by the plastic strip;

(vi) coating the substrate with the plastic strip at high speed

This achieves the effect of enabling a considerably inner plastic layer to be applied onto the metal strip in a controlled and economically viable manner.

It is remarked that U.S. Pat. No. 5,407,702 discloses a method for coating a metal strip with a polymer extrudate which extrudate after extrusion is firstly brought into contact with a surface having a temperature which will promote sticking or clinging of the extrudate thereto. A typical temperature for this purpose is said to be in the range of about 120° C. to 180° C.

The invention is also embodied in an apparatus for the continuous strip-coating of a metal substrate with a layer of plastic.

Finally the invention is further embodied in a strip-coated packaging steel.

The invention will now be further illustrated by reference to the drawing comprising FIGS. 1, 2 and 3 each of which show a possible line drawing for coating in accordance with the invention, and several non-limitative examples with references to the Figures.

EXAMPLE 1

Figure 1:
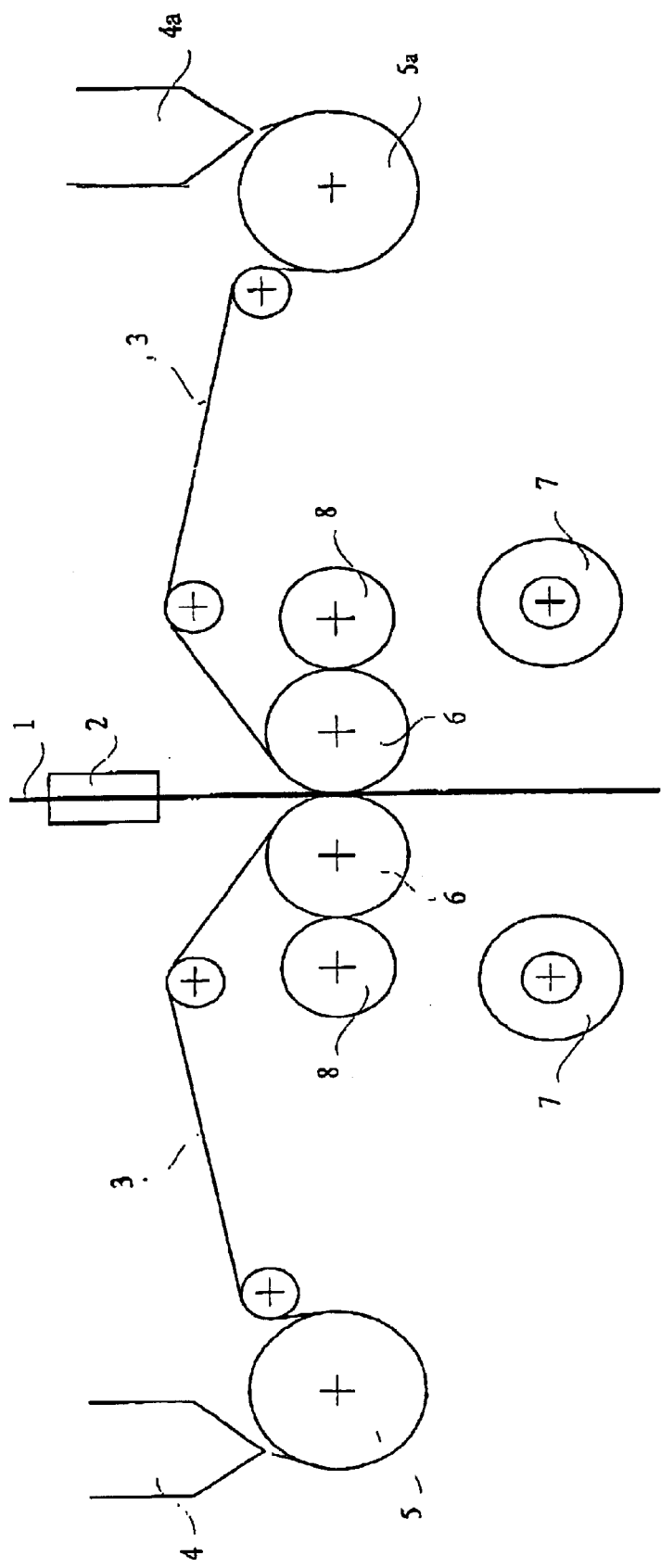
FIG. 1 is a simplified, diagrammatic line drawing of a preferred embodiment of the invention.

An ECCS substrate (1) (also known as TFS) with a thickness of 0.20 mm. This substrate is heated to a temperature of 230° C. by means of heating (2), for example comprising heated guide rolls and/or on the basis of induction, hot air or otherwise. A plastic strip (3) such as a PET plastic strip is produced by applying on each side of substrate (1) molten PET via nozzle (4), (4a) on an internally water-cooled guide roll (5), (5a). The cooled PET strip (3) is then conveyed to the rubber coated contact roll (6). As it travels it is possible to monitor the thickness, colour and strip tension and to trim to the correct width. The thickness of the two strips (3) is between 3 and 100 μm. Prior to commencement of coating the contact rolls (6) do not touch substrate (1), and the two strips are conveyed off, for example rolled up on winders (7).

In order to begin coating, contact rolls (6) are closed, i.e. moved towards substrate (1).

PET strips (3) adhere to substrate (1) and most simultaneously the pieces of ship (3) between contact roll (6) and winder (7) are cut through. The rubber of rolls (6) is cooled externally, for example by metal cooling roll (8), or by an air-blade on the rubber surface. The coated strip is then subjected to a brief extra heat treatment to 260° C. in order to optimise adhesion. At good product results, particularly suitable for example for the covers of three-piece cans.

EXAMPLE 2

As in Example 1 but now on the one side of substrate (1) the plastic flowing from nozzle (4a) is a two-layer polypropylene, whereby one of the layers, the adhesion layer, is maleic acid anhydride modified polypropylene; on the other side of the substrate a PET strip is manufactured and supplied via nozzle (4) and cooling roll (5). In this case the preheating temperature of substrate (1) is 200° C. The thickness of the two strips is between 3 and 100 μm. During the initial contact of the two-layer strip with the substrate at 200° C., a temperature above the melting temperature of polypropylene, there is already some adhesion onto substrate (1), while the polypropylene top layer neither sticks to or is damaged by the rubber of contact roll (6) that has a temperature of approx. 90° C. This adhesion to substrate (1) attains its maximum after approx. 1 second. The coated strip is then subjected to a brief extra heat treatment, for example to 260° C., in order to optimise the adhesion of both PET and modified PP. A product results, for example particularly suitable for beer bottle crown closures.

EXAMPLE 3

As in example 1 but now both plastic strips are two-layer polypropylene Substrate (1) is 0.10 mm thick ECCS and is heated to a temperature of 230° C. Now a product results with a PP layer on both sides. The higher temperature than in example 2 is necessary because of the low heat content of thin substrate. The product is particularly suitable for example for animal food packaging.

Figure 2:
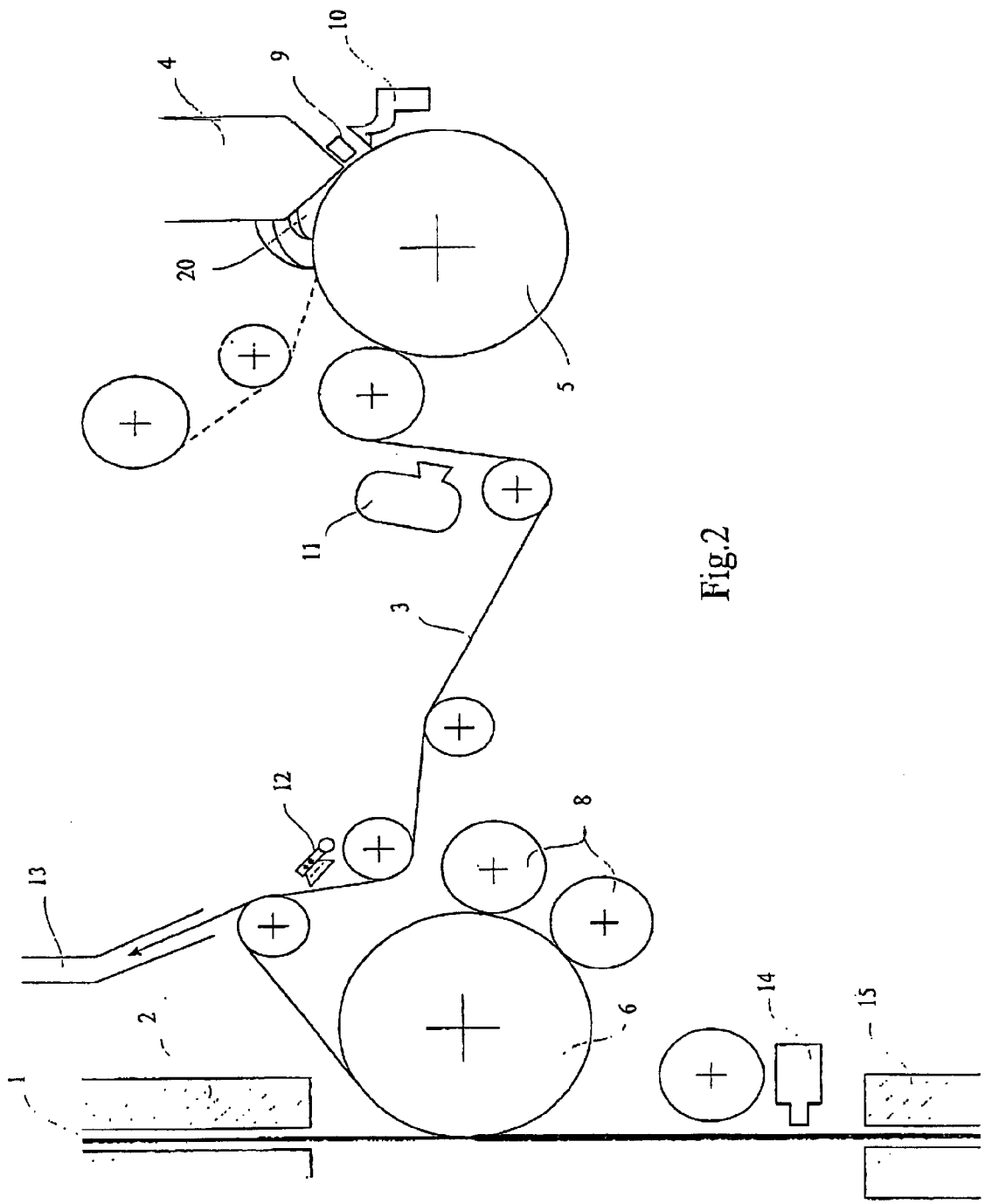
FIG. 2 is a diagrammatic line drawing of a preferred embodiment of one side of the invention which shows additional features not shown in FIG. 1.
Figure 3:
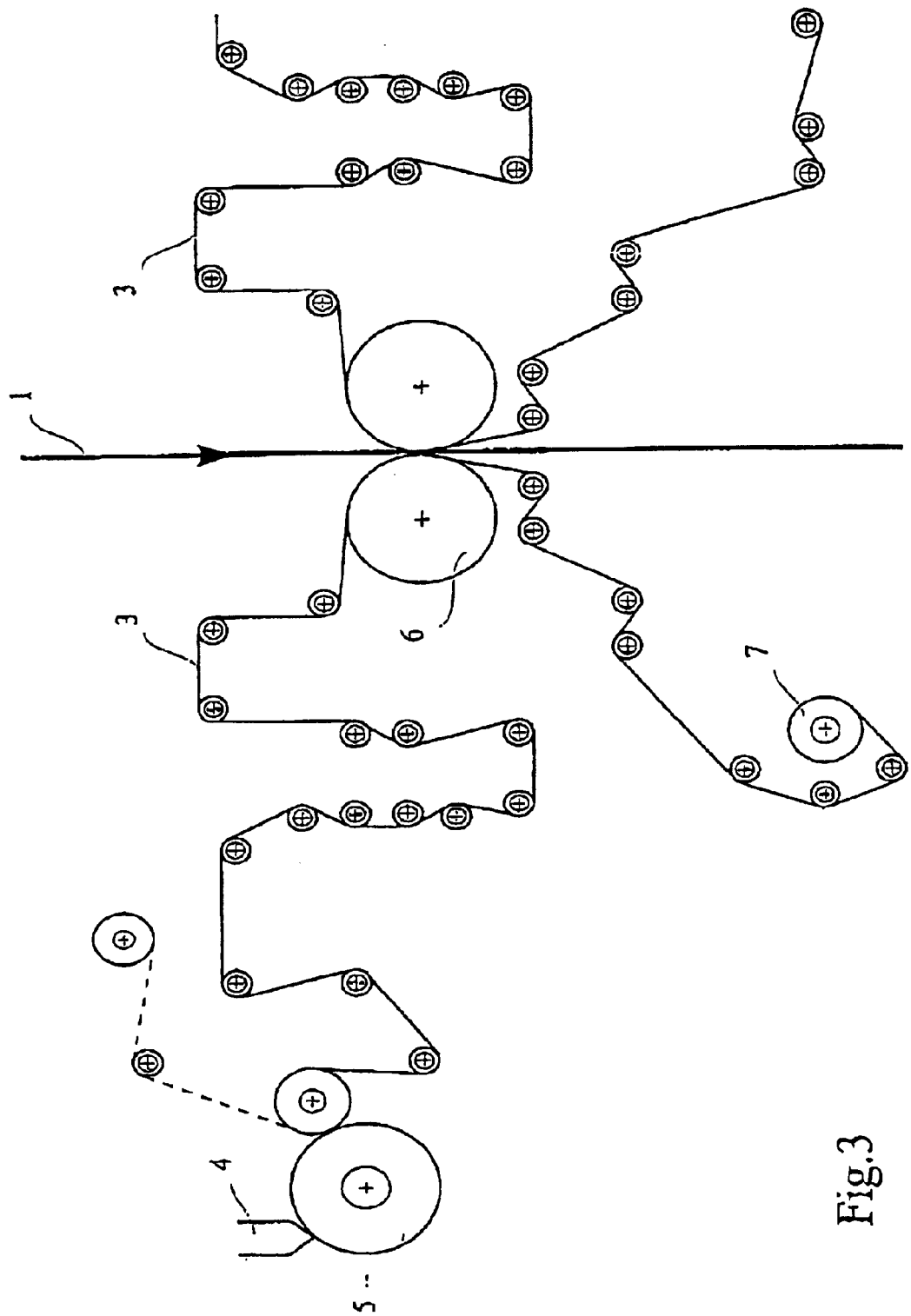
FIG. 3 is a simplified, diagrammatic line drawing of a preferred embodiment of the invention which emphasizes the relative placement of rollers and identifies the general direction of movement of a substrate.

FIGS. 1, 2 and 3 show different line drawings in accordance with the invention of coating a metal substrate with an in-line manufactured plastic strip. FIG. 2 shows a vacuum chamber (20), an electrostatic edge limiter (9), an air-blade (10) for cooling, a thickness gauge (11), an edging knife (12), a cutting waste extractor installation (13), a temperate gauge (14) and a furnace (15) for beating the coated strip.

It is possible to stretch the plastic strip at a temperature above the glass transition temperature and below the softening temperature of the plastic; in the case of uni-axial stretching an elongation of up to 400% is conceivable. If desired it is possible to provide the plastic strip with openings.

To the expert it will be clear that the invention can be applied for single-side or two-side coating of a metallic substrate with on each side the same plastic, or a different plastic for example PET or polypropylene or on one side polypropylene and on the other side PET.

As seen in FIGS. 1–3 the substrate travels along a single straight line from the heating means 2, between the contact rolls 6, and to the furnace 15 (FIG. 2). For example, FIG. 2 shows the heating means and contact roll are arranged such that the metallic strip shaped substrate is straight immediately before, during and immediately after coating.

What is claimed is:

1. A method for strip-coating a metallic strip-shaped substrate with a strip of plastic comprising the successive stages of:
   (i) plastic strip production comprising in-situ casting of a plastic strip;
   (ii) leading the plastic strip around a cooling roll;
   (iii) leading away the plastic strip between an opened contact roll and the substrate until the plastic strip production is underway and stabilized;
   (iv) bringing the plastic strip and the substrate up to speed and heating the substrate to a temperature at or above the softening temperature of the part of the plastic strip facing the substrate;
   (v) pressing the plastic strip onto the substrate by closing the contact roll and where applicable breaking off the plastic strip and stopping the plastic strip being led away, while the substrate and the cooling roll are connected by the plastic strip; and
   (vi) coating the substrate with the plastic strip;
   while performing on the plastic strip as the plastic strip travels between the cooling roll and the contact roll at least one of monitoring thickness of the plastic strip, monitoring color of the plastic strip, monitoring strip tension and trimming width of the plastic strip.

2. The method in accordance with claim 1, wherein after the plastic strip has been applied an extra heat treatment stage follows to improve adhesion.

3. The method of claim 1, wherein the cooling roll is internally water-cooled.

4. The method of claim 1, further comprising incorporating adhesion-promoting molecules into the plastic strip, wherein the coating speed is high enough that the adhesion-promoting molecules must be capable of migrating to the surface of the plastic strip within about one second after the plastic strip contacts the substrate.

5. The method of claim 1, further comprising stretching the plastic strip at a temperature above the glass transition temperature of the plastic strip.

6. The method of claim 1, further comprising uniaxially stretching the plastic strip at most 400% at a temperature above the glass transition temperature of the plastic strip.

7. The method of claim 1, wherein the metallic strip shaped substrate travels along a single straight line from the heating means to a furnace downstream of the contact roll.

8. The method of claim 1, wherein the metallic strip shaped substrate is straight immediately before, during and immediately after coating.

9. The method of claim 1, wherein the metallic strip shaped substrate is straight during coating.

10. The method of claim 1, wherein in step (iv) the substrate is heated to a temperature above the softening temperature of the part of the plastic strip facing the substrate.

11. The method of claim 1, wherein in step (iv) the substrate is heated to a temperature in the range from 200 to 230° C.

12. The method of claim 1, wherein the metallic strip has a first side and a second side opposed to the first side and the first side of the metallic strip shaped substrate is coated with said strip of plastic and simultaneously the second side of the metallic strip shaped substrate is coated with a second strip of plastic, wherein said strip-coating of said second side of said metallic strip-shaped substrate with said second strip of plastic comprising the successive stages of:
   (i) plastic strip production comprising in-situ casting of said second plastic strip;
   (ii) leading the second plastic strip around a second cooling roll;
   (iii) leading away the second plastic strip between an opened second contact roll and the substrate until the second plastic strip production is underway and stabilized;
   (iv) bringing the second plastic strip and the substrate up to speed and heating the substrate to a temperature at or above the softening temperature of the part of the second plastic strip facing the substrate;

(v) pressing the second plastic strip onto the substrate by closing the second contact roll and where applicable breaking off the second plastic strip and stopping the second plastic strip being led away, while the substrate and the second cooling roll are connected by the second plastic strip; and (vi) coating the substrate with the second plastic strip;

while performing on the second plastic strip as the second plastic strip travels between second cooling roll and second contact roll at least one of monitoring thickness of the second plastic strip, monitoring color of the second plastic strip, monitoring strip tension and trimming width of the second plastic strip.

13. The method of claim 12, wherein in step (iv) the substrate is heated to a temperature in the range from 200 to 230° C.

14. An apparatus for strip-coating a metallic strip-shaped substrate with a strip of plastic in accordance with claim 1, comprising in combination:

means of conveying the metallic strip-shaped substrate;

a contact roll for pressing the plastic strip onto the substrate;

means of producing the plastic strip comprising means of casting for casting the plastic;

a cooling roll for the formation of a plastic strip;

means of feeding and guiding for bringing the plastic strip to the substrate via the contact roll and for leading away the plastic strip between an open said contact roll and the substrate until the plastic strip production is underway and stabilized;

wherein the contact roll is moveable to a first position apart from the substrate wherein the contact roll is suitably arranged to co-operate with a means of conveying off the plastic strip and to a second position relative to the substrate wherein the contact roll is suitable to press the plastic strip onto the substrate.

15. The apparatus in accordance with claim 14, wherein the means of conveying substrate, the contact roll, the means of casting, the cooling roll and the means of feeding and guiding are essentially duplicated, one set on each side of where the substrate is situated during operation for simultaneously two-sided coating the metallic strip shaped substrate.

16. The apparatus of claim 14, further comprising a furnace downstream of the contact roll, wherein the heating means, contact roll and furnace are arranged such that the metallic strip shaped substrate travels along a single straight line from the heating means to the furnace downstream of the contact roll.

17. The apparatus of claim 14, wherein the heating means and contact roll are arranged such that the metallic strip shaped substrate is straight immediately before, during and immediately after coating.

18. The apparatus of claim 14, wherein the heating means and contact roll are arranged such that the metallic strip shaped substrate is straight during coating.

19. The apparatus in accordance with claim 14, wherein the contact roll is rubber at least on a surface with which it comes into contact with the plastic band.

20. The apparatus in accordance with claim 19, wherein the means of conveying substrate, the contact roll, the means of casting, the cooling roll and the means of feeding and guiding are essentially duplicated, one set on each side of where the substrate is situated during operation for simultaneously two-sided coating the substrate.

* * * * *